United States Patent [19]
Kimura et al.

[11] Patent Number: 4,624,914
[45] Date of Patent: Nov. 25, 1986

[54] OPTICAL INFORMATION RECORDING MEDIUM OF TE, O AND PD AND METHOD FOR MAKING SAME

[76] Inventors: Kunio Kimura, 5-1-612, Makino Kita-machi, Hirakata-shi, Osaka; Masatoshi Takao, 1-1-3, Setoguchi, Hirano-ku, Osaka-shi, Osaka; Nobuo Akahira, 13-6, Otokoyama Kanaburi, Yawata-shi, Kyoto; Mutsuo Takenaga, 12-305, 4-chome, Ikuno, Katano-shi, Osaka, all of Japan

[21] Appl. No.: 775,302

[22] Filed: Sep. 12, 1985

[30] Foreign Application Priority Data

Sep. 13, 1984 [JP] Japan .................................. 59-192003

[51] Int. Cl.⁴ .......................... G03C 1/72; G03C 1/74; B32B 7/00
[52] U.S. Cl. ..................................... 430/495; 427/250; 427/252; 430/346; 430/945; 430/964
[58] Field of Search ............... 430/346, 495, 945, 964; 346/135.1; 427/250, 252

[56] References Cited

U.S. PATENT DOCUMENTS 3,971,874  7/1976  Ohta et al. .......................... 430/495
4,278,734  7/1981  Ohta et al. .......................... 430/495

Primary Examiner—Richard L. Schilling
Attorney, Agent, or Firm—Lowe, King, Price and Becker

[57] ABSTRACT

An optical information recording medium comprising a substrate and a photosensitive thin layer consisting of Te, O and Pd. When exposed to optical energy, this thin layer is capable of undergoing a phase change by which an optical transmittance is changed. The addition of Pd results in an improvement of a response time to a great extent. This optical information recording medium is preferably made by a method using a Pd evaporation source and another source for Te+TeO$_2$.

11 Claims, 2 Drawing Figures

OPTICAL INFORMATION RECORDING MEDIUM OF TE, O AND PD AND METHOD FOR MAKING SAME

BACKGROUND OF THE INVENTION

1. Field of the Invention

This invention relates to optical information recording media which are able to record and reproduce optical information at high speed and high density by application of optical energy. The invention also relates to a method for efficiently making such recording media.

2. Description of the Prior Art

Systems of recording and reproducing high density information by utilization of a laser beam are well known. Typical recording media used for these recording and reproducing systems are those media which have a substrate and a thin film made predominantly of Te or $TeOx_1$ ($0<x_1<2$), which is a mixture of Te and $TeO_2$, and formed on the substrate. These media are described, for example, in Japanese Laid-open Pat. Application Nos. 50-46317, 50-46318, 50-46319 and U.S. Pat. No. 3971874. Aside from the main constituent, $PbOx_5$ ($0<x_5<1$), $SbOx_6$ ($0<x_6<1.5$), $VOx_7$ ($0<x_7<2.5$) and the like are added as additives. These recording media have a greatly varying transmission upon irradiation of an optical beam.

The recent trend toward the compactness and simplicity of a recording and reproducing apparatus places a limitation on the output power of a laser beam source. For the recording and reproducing operations using a small-sized He-Ne laser oscillator or a semiconductor laser oscillator having an output power within 20 mW, the known recording media using $TeOx$ ($0<x<2$) are not satisfactory because of the insufficient sensitivity thereof. Alternatively, where recorded information is reproduced as a variation in quantity of reflected light, such a variation as to be high enough for the reproduction cannot be obtained.

In order to overcome the above drawbacks, attempts were made in which an additive having a low melting point was added to $TeOx$ ($0<x<2$) so that the threshold temperature lowered. For instance, $TlOx$ ($0<x<1.5$) having a melting point of 300° C. for $Tl_2O$ was added. However, the addition of this type of additive was not necessarily satisfactory.

On the other hand, in order to produce a larger variation of optical characteristics accompanied by the phase change of the oxide, attempts have been made in which a refractive index of a medium was increased. For these purposes, additives having a large ionic polarizability and a high density are used, e.g. $BiOx_2$ and $InOx_2$ ($0<x_2<1.5$). These media are described, for example, in Japanese Pat. Application Nos. 53-109002 and 54-71506.

According to the above methods, the recording medium based on the $TeOx$ compound could be used for recording by a semiconductor laser and for reproduction according to variations in amount of reflected light.

However, as the information-oriented society is being advanced, a higher speed of information transmission is required. This necessitates a higher recording speed, higher reproduction speed and higher recording sensitivity than is now experienced in this art.

SUMMARY OF THE INVENTION

It is therefore an object of the present invention to provide an improved optical information recording medium which comprises a photosensitive thin film of a composite material consisting essentially of Te, O and Pd whereby while the characteristic features of TeOx are shown, much higher recording speed and higher recording sensitivity are ensured.

It is another object of the invention to provide a method for making the above type of optical information recording medium in an efficient manner.

The optical information recording medium of the present invention is characterized by a photosensitive thin layer formed on a substrate. The photosensitive thin layer is a chalcogenide composite material consisting essentially of at least three elements of Te, O and Pd provided that the content of Pd is in the range of from 5 to 40 atm% and the content of O is in the range of from 20 to 60 atm% with the balance of Te. The optical information recording medium has a much improved recording speed and a carrier-to-noise ratio (hereinafter referred to simply as C/N ratio).

DETAILED DESCRIPTION AND EMBODIMENTS OF THE INVENTION

Figure 1:
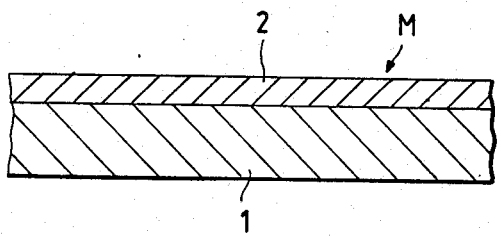
FIG. 1 is a schematic sectional view of an optical information recording medium according to the invention.

Reference is now made to FIG. 1, in which there is generally shown an optical information recording medium M. The medium M has a substrate 1 and a photosensitive thin layer 2 deposited on the substrate 1. The substrate 1 may be in the form of a disc, a sheet, a drum or the like. The materials for the substrate 1 include, for example, metals such as aluminium, copper and the like, glasses such as quartz, pyrex, soda glass and the like, and synthetic or natural resins such as ABS resins, polystyrene, acrylic resins, polycarbonates, vinyl chloride resins, acetate resins, fluorine resins, polyesters and the like. If a transparent substrate is required, polycarbonates and acrylic resins are preferred because of the high transparency thereof.

The photosensitive thin layer 2 may be formed by vacuum evaporation, sputtering and the like techniques for depositing metals or ceramics on a substrate. If the vacuum evaporation is used, a starting material may be heated by a method in which heat is applied to the starting material indirectly from outside such as by resistance heating, or by a method in which the material is directly heated, for example, by application of an electron beam. In view of the ease in control of the vacuum evaporation and productivity, the electron beam method is preferred. In the practice of the invention, the best results are obtained when the thin film of at least three elements of Te, O and Pd is formed using an electron beam method which makes use of two evaporation sources as will be described in detail hereinafter.

As is known in the art, the thin film of TeOx, which is a mixture of $TeO_2$ and Te, turns its optical constant upon irradiation of a high density light ray such as a laser beam and is observed to be black in color. This variation is utilized to record or reproduce optical information. It is considered that the variation is based on the phase change the Te grains (including a change in size of crystal grain) in the film through a process of beam irradiation-absorption-temperature rise. In other words, the variation is based on an optical change caused by the growth of crystal grains. In order to increase the recording speed, it is considered important to complete the phase change as soon as possible. However, in the known TeOx thin film, at the time when the Te grains undergo the phase change on recording, coexisting $TeO_2$ serves as a barrier and thus it takes a certain time before completion of the structural relaxation where the grains in the thin film are converted to a more stable crystal state. This is not disadvantageous when rercorded information is a picture, but places an undesirable limitation on the design of an apparatus when the recording medium is a computer disc requiring a high response.

In the practice of the invention, the photosensitive thin film consists of a mixture of Te and $TeO_2$, i.e. TeOx where $0 < x < 2$, to which Pd is added. Suitable control of the three elements of Te, O and Pd enables one to make a photosensitive thin recording layer which ensures recording within a much shorter period of time. Thus, an optical recording medium having high recording and reproducing speeds can be fabricated.

In prior art, there were proposed optical information recording media which made use of combinations of a mixture of Te and $TeO_2$ and a third element in order to improve optical recording characteristics. However, the third elements used are elements having the capability of a relatively high covalent bond such as Ge, Sn, Pb, Si, Sb, Se and the like. These elements are likely to form a glassy composition by combination with Te or a mixture of Te and $TeO_2$.

In the practice of the invention, an element capable of metallic bonding with TeOx is used. Au, Ag, Cu and Pd show such a metallic bonding, of which Pd is selected as preferred because it exhibits a specific better effect when used within a range defined hereinafter. Pd used in combination with TeOx is considered to act as follows.

It is considered that Pd serves to promote the phase change of Te in the TeOx thin film at the time of recording, i.e. it acts as a nucleus for crystals. A small amount of Pd is sufficient to complete the phase change of Te and thus ensure a high recording speed. Also, assuming that a portion where exposed, for example, to a laser beam is softened or melted, the completion of the phase change of Te at high speed means that the phase change completes in an extent where the viscosity of the film is still low. The crystal grains of Te having a higher crystallinity are considered to result. This leads to a greater variation of reflectance of reflected light and a high C/N ratio. When Pd is added to TeOx, the absorption efficiency of light is improved, enabling one to write by the use of a laser beam of low power. Thus, the recording medium of the invention has high sensitivity. Since Pd undergoes little or no oxidation, the moistureproof properties of the TeOx film are not impeded.

The amount of Pd in the photosensitive thin film of the invention ranges from 5 to 40 atm% of the total amount of Te, O and Pd. Pd is considered to exist partially as amorphous PdTe in the film. When heated, for example, by means of a laser beam, the amorphous PdTe is converted to a crystal, bringing about an optical change.

PdTe should not be necessarily present in the film in stoichiometric amounts, but may exist as an alloy composition of PdTe-Te. PdTe functions as nuclei for crystallization and acts to promote the crystallization rate, as a whole. Accordingly, it is sufficient to make the amount of Pd smaller than Te. However, when the amount of Pd is less than 5 atm%, the nuclei of PdTe in the film become too small in number and the high speed crystallization cannot be expected. If the amount of Pd increases, the absorption efficiency of light is improved with good recording sensitivity. However, amounts larger than 40 wt% result in a reduced amount of Te relative to Pd, so that the change in quantity of reflected light prior to and after recording lowers. This is why the amount of Pd is determined to be in the range f from 5 to 40 atm%.

The content of oxygen is now described.

The substantial amount of oxygen in the layer is present as $TeO_2$. The amount of $TeO_2$ in the layer is important because the moistureproof properties depend on the amount of $TeO_2$. Larger amounts of $TeO_2$ result in better moistureproof properties. In this sense, larger amounts of oxygen are more preferable, but if oxygen is added in too large an amount, relative amounts of Te and Pd become small. This entails a lowering of light absorption efficiency of the film and a lowering of sensitivity with a small variation of reflectance prior to and after recording. Thus, a high C/N ratio cannot be obtained. In the practice of the invention, the amount of oxygen is in the range of from 20 to 60 atm% based on the total amount of Te, O and Pd. Amounts less than 20 atm% are unfavorable since the moistureproof properties deteriorate, whereas amounts larger than 60 atm% result in a lowering of recording sensitivity. The balance is Te which is in the range of 33 to 70 atm%.

Preferably, Pd is used in an amount of from 8 to 35 atm% and oxygen is used in an amount of from 30 to 55 atm%, with the balance of Te provided that the ratio by atm% of O to Te is in the range of $0.5 < O/Te < 1.8$. This is more particularly described in Example 1 hereinafter.

Aside from the essential components of Te, O and Pd, at least one element selected from the group consisting of Ge, Sn, Al, Cu, Ag, Au, Se, Bi, In, Pb, Si, Pt, Sb, As, V, Cr, Co and Ni may be added in order to improve optical characteristics and heat resistance. The amount of the at least one element is generally in the range of from 1 to 20 atm%. The optical information recording medium of the invention is applied not only as a write-once medium, but also as anerasable medium. In the latter case, the above-indicated at least one element is preferably added so as to improve erasure characteristics.

Formation of the photosensitive thin layer on a substrate is described. As mentioned before, the electron beam method is preferably used in the practice of the invention. Three different manners of depositing the layer by the electron beam technique are considered using one to three evaporation sources.

A mixture of Te, O and Pd in the form of a kind of alloy is formed on a substrate. In practice, Te, $TeO_2$ and Pd are used as starting materials.

A mixture of Te, O and Pd as a kind of alloy may be formed on a substrate by the use of an electron beam evaporator using three sources. In practice, starting materials are a mixture of Te, $TeO_2$ and Pd. If an electron beam evaporator using three evaporation sources is used, the evaporation conditions include a vacuum not larger than $1 \times 10^{-5}$ Torr.

Alternatively, the photosensitive thin layer may be formed by a method using two evaporation sources, one source for metallic Pd and the other source for a sintered product of Te and $TeO_2$. The sintered product may be readily obtained by mixing Te, $TeO_2$ and a metal capable of reducing TeO$_2$ in a predetermined ratio and heating the mixture at 600° to 720° C. while passing a stream of an inert gas such as nitrogen gas in order to reduce part of TeO$_2$. The resulting product is powdered and pelletized to obtain pellets which are subsequently used for evaporation. The evaporation conditions are similar to those indicated with respect to the three source method.

If a mere mixture of Te and TeO$_2$ is used for evaporation, Te which has a higher vapor pressure, tends to initially deposit on the substrate, so that the concentration of oxygen in the layer lowers. As mentioned above, a metal capable of reducing TeO$_2$ is added, in the form of a powder, to the mixture of Te and TeO$_2$ and sintered. Examples of the reducing metals include Al, Cu, Zn, Fe and Pb. Of these, Al and Cu are preferred because they have greater reducing ability and the oxides formed during the sintering process, i.e. Al$_2$O$_3$ or CuO, are not incorporated into the thin layer. This is because the vapor pressure of the oxide is lower than the pressure of Te or TeO$_2$. In addition, Al$_2$O$_3$ and CuO are thermally stable, so that the sintered product can retain its shape during the evaporation, ensuring stable evaporation.

Moreover, a method using one evaporation source may also be used for fabrication of the layer. In this case, a mixture of Te, TeO$_2$, Pd and a metal capable of reducing is mixed in desired ratios and sintered similar to the above case. The sintered product is subjected to vacuum evaporation under conditions similar to the above two methods. However, this method is rather disadvantageous in that a large amount of Pd should be used in the sintered product and that because the sintered product cannot be used repeatedly, non-evaporated Pd is in vein with high production cost.

Of the above three methods, the method using two evaporation sources is preferred because the compositional control is easy and the photosensitive thin layer of good quality can be formed reliably and reproducibly though other methods may be used as described in examples.

The photosensitive thin layer is generally formed in a thickness of from 100 to 2000 angstrom. This is because a uniform layer cannot be formed when the thickness is below 100 angstrom, whereas the laser beam is unlikely to be absorbed in the layer at a thickness over 2000 angstrom.

The present invention is more particularly described by way of example.

EXAMPLE 1

An electron beam evaporator capable of three source evaporation was used and TeO$_2$, Te and Pd were vacuum evaporated from the respective sources on an acrylic resin disc substrate having a thickness of 1.1 mm and a diameter of 200 mm while rotating the substrate at a rate of 150 r.p.m., thereby obtaining an optical disc. The thickness of the evaporated layer was 1200 angstrom. The respective evaporation rates were varied for controlling the ratios by atomic percent of the respective components.

A number of optical discs made according to the above procedure were subjected to an elementary analysis using the Auger electrospectroscopy (hereinafter abbreviated as AES). A signal of a single frequency of 5 MHz was recorded by means of a laser beam in each optical disc rotating at 1800 r.p.m. at a position of 75 mm from the disc center in such a way that the C/N ratio became maximum at completion of the recording. The C/N ratios of the signal 33 milliseconds after the recording (which was a time required for one revolution of the optical disc after irradiation of a laser beam) and after 2 minutes (by which recording completed for all optical discs) were determined. Each disc was also subjected to the moistureproof test. The results are shown in Table 1.

TABLE 1

| Disc No. | AES Elementary Analysis | | | C/N Ratio of Recorded Signal (dB) | | Moisture-proof Property | Overall Evaluation |
|---|---|---|---|---|---|---|---|
| | Te | O | Pd (atm %) | after 3 ms. | after 2 min. | | |
| 1 | 28 | 60 | 12 | 41 | 41 | good | moderate |
| 2 | 39 | 55 | 6 | 50 | 50 | good | good |
| 3 | 36 | 48 | 16 | 57 | 57 | good | good |
| 4 | 25 | 35 | 40 | 51 | 51 | good | moderate |
| 5 | 20 | 34 | 46 | 46 | 46 | good | poor |
| 6 | 43 | 49 | 8 | 54 | 54 | good | good |
| 7 | 54 | 42 | 4 | 55 | 56 | good | moderate |
| 8 | 34 | 42 | 24 | 53 | 53 | good | good |
| 9 | 33 | 32 | 35 | 51 | 51 | good | good |
| 10 | 59 | 36 | 5 | 53 | 53 | good | moderate |
| 11 | 49 | 33 | 18 | 59 | 59 | good | good |
| 12 | 66 | 30 | 3 | 55 | 57 | good | moderate |
| 13 | 66 | 20 | 14 | 51 | 51 | moderate | moderate |
| 14 | 72 | 18 | 10 | 55 | 55 | poor | poor |
| 15 | 69 | 23 | 8 | 58 | 58 | good | good |
| 16 | 73 | 17 | 10 | 58 | 58 | poor | poor |
| 17 | 50 | 30 | 20 | 62 | 62 | good | good |
| 18 | 68 | 32 | 0 | 50 | 56 | good | poor |
| 19 | 61 | 39 | 0 | 47 | 53 | good | poor |
| 20 | 48 | 52 | 0 | 40 | 48 | good | poor |

Figure 2:
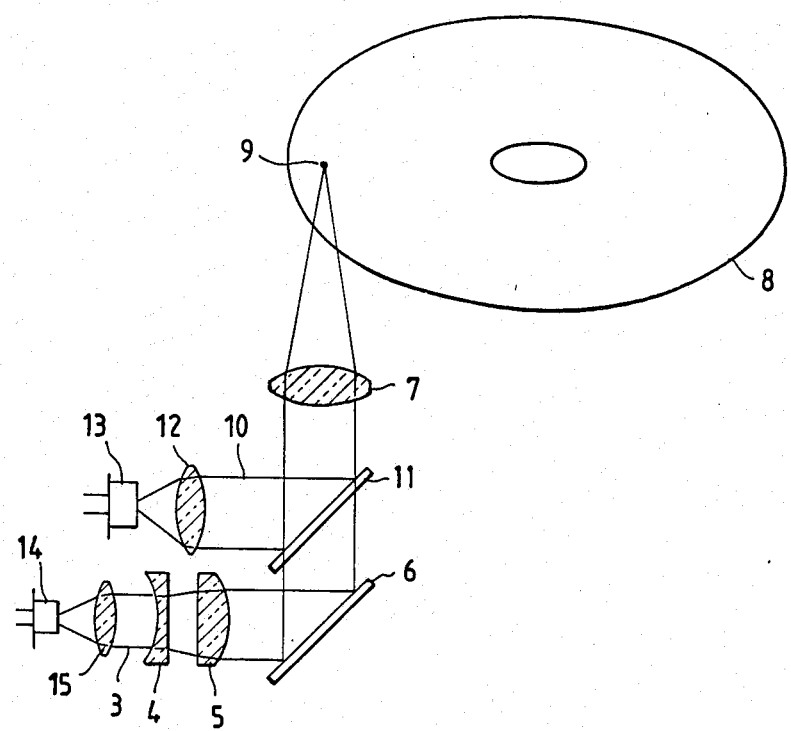
FIG. 2 is a schematic view showing a recording and reproducing apparatus for an optical disc.

In the above tests, the recording and reproducing test was effected using a system shown in FIG. 2. In the figure, a light ray having a wavelength of 830 nm generated from a semiconductor laser 14 is converted to pseudo parallel rays by means of a first lens 15 and dressed into a round ray by the use of a second lens 4. Thereafter, the ray is again changed into parallel rays by means of a third lens 5 and its axis is changed by a mirror 6. The light ray is then focussed, as a spot 9 having a wave limit of about 0.8 $\mu$m, on an optical disc 8 by means of a fourth lens 7 through a half-mirror 11. The recording layer of the optical disc 8 irradiated with the round spot 9 is turned black as a result of the phase or optical change of Te, by which information can be recorded. Thus, the semiconductor laser is modulated to record an information signal on the optical disc.

The signal can be detected by receiving reflected light from the optical disc surface 8 through the half mirror 11, which is then passed through a lens 12 to a photoresponsive diode 13.

The reason why there are recording media in which the C/N ratio after 2 minutes is larger than the ratio after 33 milliseconds in Table 1, is considered as follows: the crystal grains of Te in the layer are growing within 33 msec., and thus the recording does not yet complete. On the other hand, with the recording media having the same C/N ratio at 33 msec. and 2 minutes after the laser beam irradiation, the recording completes within 33 msec.

The moistureproof test was effected as follows. At the time when optical discs were made, a recording thin film was similarly formed on a glass substrate having a dimension of 18×18×0.2 mm for use as a test sample. These samples were allowed to stand under conditions of 50° C. and 90%RH. The moistureproof properties were evaluated as "good" when no change was microscopically observed on the 10th day, as "moderate" when a slight change was recognized, and as "poor" when crystallization proceeded with a black pattern being recognized or when Te in the layer was oxidized with an increasing transmittance.

As will be seen from the results of Table 1, the composition of the Te-O-Pd thin layer which exhibits a C/N ratio over 50 dB after completion of the recording, a time of completing the recording within 33 msec. after irradiation of the laser beam and good moistureproof properties, i.e. overall evaluation of "good" or "moderate", is 5 to 40 atm% of Pd and 20 to 60 atm% of O with the balance of Te. A preferable composition as "good" comprises 8 to 35 atm% of Pd and 30 to 55 atm% of O with the balance, i.e. 33 to 70 atm%, of Te.

The general procedure of Example 1 was repeated using instead of Pd, Ag and Cu for reference, thereby obtaining optical discs having Te-O-Ag thin layers and Te-O-Cu thin layers. These discs were also subjected to similar tests. The test results are shown in Table 2.

TABLE 2

| Disc No. | AES Elementary Analysis | | | | C/N Ratio of Recorded Signal (dB) | | Moisture-proof Property |
|---|---|---|---|---|---|---|---|
| | Te | O | Ag (atm %) | Cu | after 3 ms. | after 2 min. | |
| 21 | 59 | 39 | 2 | | 45 | 50 | good |
| 22 | 52 | 43 | 5 | | 40 | 43 | good |
| 23 | 66 | 27 | 7 | | 46 | 52 | good |
| 24 | 49 | 37 | 14 | | 38 | 44 | good |
| 25 | 42 | 36 | 22 | | 35 | 39 | good |
| 26 | 70 | 27 | | 3 | 47 | 52 | moderate |
| 27 | 48 | 47 | | 5 | 38 | 43 | poor |
| 28 | 57 | 38 | | 5 | 40 | 43 | poor |
| 29 | 59 | 30 | | 11 | 36 | 40 | poor |
| 30 | 41 | 40 | | 19 | 32 | 35 | poor |

As will been seen from the above table, the addition of Ag or Cu is not favorable because the signal cannot be recorded at such a high speed as in the case of Pd.

EXAMPLE 2

An electron beam evaporator capable of evaporation from two sources was used in which Pd was vacuum evaporated from one source and Te and $TeO_2$ were evaporated from the other source, thereby obtaining optical discs. Te and $TeO_2$ were vacuum evaporated from one source at the same time in the following manner. Eighty five percent by weight of $TeO_2$ and fifteen percent by weight of Al were mixed using a small amount of alcohol. Twenty five grams of the mixture was mounted on a quartz boat and sintered by the use of an electric furnace at 700° C. for 2 hours while passing nitrogen gas, by which part of $TeO_2$ was reduced. The resulting sintered product was powdered and pressed to obtain pellets. The pellets were used for vacuum evaporation. A 1200 angstrom thick thin film was deposited on an acrylic resin substrate of the same type as used in Example 1, in which Pd was deposited at a rate of 1 angstrom/second and Te+$TeO_2$ were deposited at a rate of 20 angstrom/second.

The above film was subjected to the AES elementary analysis with the result that Te=60 atm%, O=30 wt% and Pd=10 atm%. The disc was further subjected to the recording and reproducing test and the moistureproof test. Thirty three milliseconds and 2 minutes after the laser beam irradiation, the C/N ratios were both found to be 62 dB and thus the recording completed at the high speed. The moistureproof property was evaluated as "good".

EXAMPLE 3

In order to form a Te-O-Pd thin film by evaporation from only one source, 60 wt% of $TeO_2$, 10 wt% of Al and 30 wt% of Pd were mixed using a small amount of alcohol. Twenty five grams of the mixture was mounted on a quartz boat, followed by sintering in an electric furnace at 700° C. for 2 hours while passing nitrogen gas, by which part of $TeO_2$ was reduced. The resulting sintered product was powdered and pressed to obtain pellets for use in evaporation. The pellets were evaporated on an acrylic resin substrate of the same type as in Example 1 at an evaporation rate of 20 angstrom/second, thereby forming an optical disc having a 120 angstrom thick film thereon.

The AES elementary analysis revealed that the film contained 57 atm% of Te, 36 atm% of O and 7 atm% of Pd. The disc was subjected to the recording and reproducing test and the moistureproof test, with the result that the C/N ratios after 33 msec. and 2 minutes were both 60 dB and the moistureproof property was found to be "good".

EXAMPLE 4

The general procedure of Example 2 was repeated except that the sintered product was prepared using 15 wt% of Cu, Zn, Fe, Pd and a mixture of 10 wt% of Al and 5 wt% of Cu in combination with 85 wt% of $TeO_2$. The resulting discs were subjected to similar tests. The results are shown in Table 3 below.

TABLE 3

| Metal | AES Elementary Analysis | | | C/N Ratio (dB) | Moisture-proof Property |
|---|---|---|---|---|---|
| | Te | O | Pd (atm %) | | |
| Cu | 53 | 47 | 10 | 55 | good |
| Zn | 56 | 44 | 10 | 58 | good |
| Fe | 58 | 42 | 10 | 59 | good |
| Pd | 55 | 45 | 10 | 58 | good |
| Al + Cu | 58 | 42 | 10 | 60 | good |

What is claimed is:

1. An optical information recording medium comprising a substrate and a photosensitive thin layer formed on said substrate and consisting essentially of from 5 to 40 atm% of Pd, from 20 to 60 atm% of O and the balance of Te, said O and Te forming a mixture of Te and $TeO_2$.

2. An optical information recording medium according to claim 1, wherein Pd is contained in an amount of from 8 to 35 atm% and O is contained in an amount of from 30 to 55 atm% with the balance of Te provided that the ratio of O to Te by atom% is $0.5 < O/Te < 1.8$.

3. An optical information recording medium according to claim 1, wherein O is contained as an oxide of Te.

4. An optical inforation recording medium according to claim 1, wherein said thin layer further comprises at least one element selected from the group consisting of Ge, Sn, Al, Cu, Ag, Au, Se, Bi, In, Pb, Si, Pt, Sb, As, V, Cr, Co and Ni.

5. An optical information recording medium according to claim 4, wherein said at least one element is added in an amount of from 1 to 20 atm%.

6. A method for making an optical information recording medium which comprises providing an evaporation source consisting of a sintered product of Te and TeO$_2$ and another evaporation source of Pd, and subjecting the sintered product and Pd to vacuum evaporation on a substrate at different rates so that a photosensitive thin layer consisting of Te, O and Pd is formed on the substrate.

7. A method according to claim 6, wherein said sintered product is obtained by mixing Te, TeO$_2$ and a metal capable of reducing TeO$_2$ and sintering the mixture while reducing part of TeO$_2$.

8. A method according to claim 7, wherein said metal is a member selected from the group consisting of Al, Cu, Fe, Zn, Pb and mixtures thereof.

9. A method according to claim 8, wherein said metal is Al.

10. A method according to claim 8, wherein said metal is Cu.

11. A method according to claim 7, wherein said sintered product is further powdered and pelletized and the resulting pellets are used for vacuum evaporation.

* * * * *